(12) United States Patent
Mondal et al.

(10) Patent No.: US 12,542,477 B2
(45) Date of Patent: Feb. 3, 2026

(54) POWER CONVERTER

(71) Applicant: Siemens Aktiengesellschaft, Munich (DE)

(72) Inventors: Gopal Mondal, Erlangen (DE); Alexander Hensler, Gerhardshofen (DE); Henrik Krupp, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 206 days.

(21) Appl. No.: 18/579,543

(22) PCT Filed: Jun. 2, 2022

(86) PCT No.: PCT/EP2022/064992
§ 371 (c)(1),
(2) Date: Jan. 16, 2024

(87) PCT Pub. No.: WO2023/285024
PCT Pub. Date: Jan. 19, 2023

(65) Prior Publication Data
US 2024/0313627 A1 Sep. 19, 2024

(30) Foreign Application Priority Data
Jul. 16, 2021 (EP) .................................. 21186142

(51) Int. Cl.
*H02M 7/219* (2006.01)
*H02M 1/00* (2006.01)
(Continued)

(52) U.S. Cl.
CPC ......... *H02M 1/0054* (2021.05); *H02M 7/219* (2013.01); *H02M 1/126* (2013.01); *H02M 5/458* (2013.01)

(58) Field of Classification Search
CPC ....... H02M 1/126; H02M 5/458; H02M 7/219
See application file for complete search history.

(56) References Cited

U.S. PATENT DOCUMENTS

| | | | |
|---|---|---|---|
| 9,973,103 B1* | 5/2018 | Vadhavkar | H02M 1/084 |
| 2007/0040534 A1* | 2/2007 | Ghosh | H02M 7/219 |
| | | | 323/207 |
| 2019/0028039 A1* | 1/2019 | Sodo | H02M 1/126 |

FOREIGN PATENT DOCUMENTS

| | | | |
|---|---|---|---|
| EP | 3 514 939 | 7/2019 | H02M 7/487 |
| EP | 3 537 589 | 9/2019 | H02M 7/537 |

OTHER PUBLICATIONS

Search Report for International Application No. PCT/EP2022/064992, 14 pages, Aug. 4, 2022.
(Continued)

*Primary Examiner* — Gary A Nash
(74) *Attorney, Agent, or Firm* — Slayden Grubert Beard PLLC

(57) ABSTRACT

Various embodiments of the teachings herein include a power converter to convert between a first, AC voltage and a second voltage. An example includes: half-bridges connected in parallel, each comprising two semiconductor switches connected serially with outer terminals of the half-bridge forming terminals for the second voltage; a filter connected between midpoints of the half-bridges and terminals for the first voltage, comprising an inductor and a capacitor; a sensor for each half-bridge to measure current flowing between the midpoints of the half-bridges and the filter circuit; and a control circuit to operate the switches. The control circuit determines switching times using a modified reference voltage signal resulting in a softened bus clamp modulation. A controller creates the modified reference voltage signal using an unmodified reference voltage (Continued)

signal as a setpoint input and a sum of the current signals from the current sensors as measured input.

13 Claims, 4 Drawing Sheets

(51) Int. Cl.
    *H02M 1/12*     (2006.01)
    *H02M 5/458*     (2006.01)

(56)     References Cited

OTHER PUBLICATIONS

Search Report for EP Application No. 21186142.2, 10 pages, Jan. 4, 2022.
Liu Fangcheng et al: "An adaptive Discontinuous Pulse Width Modulation (DPWM) method for three phase inverter"; 2017 IEEE Applied Power Electronics Conference and Exposition (APEC); IEEE; pp. 1467-1472, Mar. 26, 2017.

\* cited by examiner

POWER CONVERTER

CROSS-REFERENCE TO RELATED APPLICATIONS

This application is a U.S. National Stage Application of International Application No. PCT/EP2022/064992 filed 1 Jun. 2, 2022, which designates the United States of America, and claims priority to EP application Ser. No. 21/186,142.2 filed Jul. 16, 2021, the contents of which are hereby incorporated by reference in their entirety.

TECHNICAL FIELD

The present disclosure relates to power systems. Various embodiments of the teachings herein may include power converters.

BACKGROUND

Many electronic power converters use semiconductor switches arranged in one or more half-bridges to provide conversion between voltages. In many cases the conversion is between a DC voltage, for example the voltage provided by a DC link and an AC voltage. When the semiconductor switches are operated by pulse width modulation (PWM) they are switched at a high frequency of anywhere between 10 kHz and several MHz, leading to a certain amount of switching losses and common mode noise (CM noise). Converters typically feature a passive filter designed to handle this CM noise. The size of the filter that is necessary depends on the amplitude of the noise. Since the filter components, capacitors and inductors, already tend to be bulky and heavy compared to components such as semiconductor switches decreasing their size is always desirable. In the case of high CM noise the inductor may even require special cooling, adding further weight and size.

One method to lower switching losses uses a discontinuous PWM (DPWM) method wherein for a contiguous part of the voltage period of the AC voltage switching is entirely suspended in favor of keeping one of the switches of the half-bridge in an on-state and the other switch in an off-state. This part of the voltage period is far longer than a switching period according to the switching frequency used by the PWM otherwise and may extend to 60°. FIG. 1 shows a reference voltage signal 10 used to implement such a DPWM switching method.

Using the reference voltage signal of FIG. 1 leads to high common mode current spikes at the points in the signal where a voltage step occurs. The amplitude of these spikes is generally difficult to predict and also depends on the modulation index and thus it is difficult to design a correct inductor for the common mode filter to avoid core saturation. Due to the reasons mentioned above, oversizing the filter components is highly undesirable.

Furthermore, the CM inductor can also be saturated if external CM noise entering the converter circuit is high. The source of external CM noise can for example be another switching device connected at the same power line. External CM noise may not be foreseeable in all cases and using even bigger filter components for potential external CM noise is unattractive.

SUMMARY

The teachings of the present disclosure include improved power converters, e.g., a power converter with smaller common mode filter components. For example, some embodiments of the teachings herein include a power converter (20) for conversion between a first, AC voltage and a second voltage comprising: at least two half-bridges connected in parallel, each half-bridge comprising two semiconductor switches (221 . . . 226) connected serially, the outer terminals of the half-bridge forming terminals for the second voltage, a filter circuit connected between the midpoints of the half-bridges and terminals for the first voltage, the filter circuit comprising an inductor (25 . . . 27) and a capacitor (28, 29), a current sensor (321 . . . 323) for each of the half-bridges arranged to measure the current flowing in connections between the midpoints of the half-bridges and the filter circuit, and a control circuit (30) for operating the semiconductor (221 . . . 226), the control circuit (30) being arranged to determine switching times of the semiconductor switches (221 . . . 226) using a modified reference voltage signal (38) resulting in a softened bus clamp modulation, wherein the control circuit (30) comprises a controller (31) that is arranged to create the modified reference voltage signal (38) using an unmodified reference voltage signal (12) as a setpoint input and the sum of the current signals (32) from the current sensors (321 . . . 323) as measured input.

In some embodiments, the controller (31) is arranged to create the modified reference voltage signal (38) in such a manner that its derivative is continuous, thus making the reference voltage signal (12) differentiable.

In some embodiments, the controller (31) is arranged to output a common mode current error signal.

In some embodiments, the power converter comprises three half-bridges connected in parallel.

In some embodiments, the control circuit (30) is arranged to operate the semiconductor switches (221 . . . 226) so that a contiguous part of at least 10°, particularly at least 50°, of the voltage period of the first voltage one of the semiconductor switches (221 . . . 226) is kept in an on-state while the other of the semiconductor switches (221 . . . 226) is kept in an off-state.

In some embodiments, the control circuit (30) is arranged to operate the semiconductor switches (221 . . . 226) so that a contiguous part of less than 60° of the voltage period of the first voltage one of the semiconductor switches (221 . . . 226) is kept in an on-state while the other of the semiconductor switches (221 . . . 226) is kept in an off-state.

In some embodiments, the filter circuit comprises a common mode filter and a differential mode filter, wherein the common mode filter comprises a coupled inductor (27) with a coil in each connection line between the first voltage and the half-bridges.

In some embodiments, the control circuit (30) is arranged to apply a low pass filter (34) to the reference voltage signal (12).

In some embodiments, the control circuit (30) is arranged to apply a division by an effective capacitance value to the reference voltage signal (12).

In some embodiments, the control circuit (30) is arranged to apply a time derivative to the reference voltage signal (12).

In some embodiments, the control circuit (30) is arranged to apply a low pass filter to the signal (32) of the current sensors (321 . . . 323).

In some embodiments, the controller (31) is arranged to create the modified reference voltage signal (38) by applying a negative feedback signal created from the signal (32) of the current sensors (321 . . . 323) and the reference voltage signal (12).

In some embodiments, the controller (31) is arranged to receive a gain value as a further input value, and to apply the gain value to its proportional control.

BRIEF DESCRIPTION OF THE DRAWINGS

Example embodiments of the teachings of the present disclosure are described with reference to the accompanying drawings to which the scope of the disclosure is not limited. The illustrations of the drawings are in schematic form. It is noted that in different figures, similar or identical elements use the same reference signs. In the drawings.

DETAILED DESCRIPTION

Figure 1:
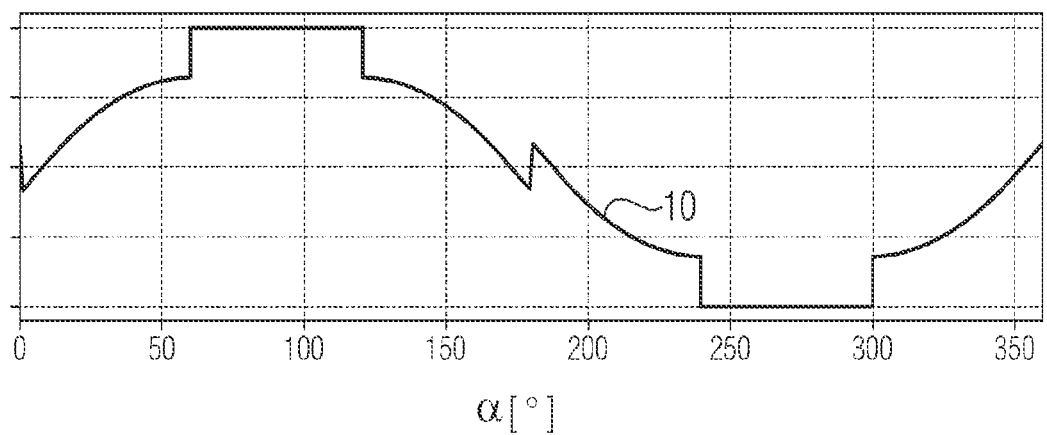
FIG. 1 shows a reference voltage signal for discontinuous pulse width modulation known from the prior art.

As an example of the teachings herein, some embodiments may include a power converter arranged for conversion between a first, AC voltage and a second voltage. It comprises at least two half-bridges connected in parallel, each half-bridge comprising two semiconductor switches connected serially, with the outer terminals of the half-bridge forming terminals for the second voltage. It further comprises a filter circuit connected between the midpoints of the half-bridges and terminals for the first voltage, the filter circuit comprising an inductor and a capacitor. The power converter further comprises a current sensor for each of the half-bridges which is arranged to measure the current flowing in the connection between the midpoint its respective half-bridge and the filter circuit.

A control circuit of the power converter is arranged for operating the semiconductor switches. It is further arranged to determine switching times of the semiconductor switches using a modified reference voltage signal resulting in a softened bus clamp modulation. It comprises a controller that is arranged to create the modified reference voltage signal using an unmodified reference voltage signal as a setpoint input and the sum of the current signals from the current sensors as measured input.

It is noted that the unmodified reference voltage may be a sum of an unmodified reference voltage signal for each output phase/half bridge. The set-point current signal is compared with said sum of the measured current signals which is a common-mode current signal. The comparison results in a common-mode current error signal which in turn is applied by said controller to modify said unmodified reference voltage signal to generate said modified reference voltage signal.

Applying the common-mode current error signal as a modifying signal further improves the active damping of the common-mode signal in a flat-top modulated converter.

Using a bus clamp modulation means the switching pattern of the semiconductor switches of one half-bridge of the converter contains a contiguous part of up to 60° of the voltage period of the first voltage wherein one of the semiconductor switches of that half-bridge is kept in an on-state while the other of the semiconductor switches is kept in an off-state. The reference voltage signal is arranged to provide this switching pattern which contains step changes of the reference voltage. A similar switching pattern is used for each of the half-bridges but phase shifted by 120° for the example of a three-phase converter.

A softened bus clamp modulation means using a reference voltage signal wherein the step changes are softened to keep the absolute value of the time derivative of the reference voltage signal below a threshold. As the contiguous parts as described above cannot overlap between phases of the converter they will be slightly shorter than 60° for a softened bus clamp modulation but still very long compared to a switching period of the semiconductor switches.

Thus, the controller may be arranged to create the modified reference voltage signal in such a manner that its derivative is continuous, thus making the reference voltage signal differentiable. It is to be understood that in a practical implementation the terms "continuous" and "differentiable" can only be realized to an extent where the non-continuous or non-differentiable parts are negligible, while the true mathematical meaning of the terms cannot be attained.

The teachings herein include power converters where the softened reference voltage signal reduces the noise that the voltage steps of the reference voltage signal of FIG. 1 creates. The controller influences the reference voltage signal based on the actual current flowing in the connections between the half-bridge midpoints and the filter. This reduces any overshooting reactions on the softened reference voltage signal by providing an active compensation through the controller using the current to generate feedback. It also corrects any influence that outside sources such as additional power converters connected to the same lines may have on the current. Thus, the power converter can reduce common mode noise even in cases where using only a softened reference voltage signal is not sufficient. It may be seen that no static variation of the reference voltage signal is able to compensate all influences that are external to the power converter. Instead, only an active and dynamic compensation such as the one according to the invention can successfully compensate such influences and at the same time keep the size of passive filter components at a minimum.

In the power converter described, the second voltage may be a DC voltage or an AC voltage. The power converter may be part of a converter that includes additional components. For example, the power converter may be connected to a DC link that comprises the second voltage and the DC link in turn may be connected to another power converter converting the DC voltage of the DC link to a third voltage. In this way a motor control converter may be formed that provides a variable frequency AC voltage for the motor from a fixed frequency AC supply voltage.

The first and the second voltage may either be an input voltage, the other being an output voltage in the case of a uni-directional power converter. The power converter may also be bi-directional, in which case neither the first nor the second voltage is specifically an output or input voltage or such a designation depends on the momentary power flow direction.

In some embodiments, the power converter comprises two or more, in a typical embodiment three, half-bridges and thus forms a three-phase power converter. Each of the half-bridges is, in this case, associated with one of the phases of the converter. For each half-bridge there is a connection line between its midpoint and a corresponding phase of the first voltage. The filter components are typically present in (e.g. serially connected) each of those connection lines or connected to each of those connection lines. For example, the filter components may comprise an inductive element in each connection line, the inductive elements being coupled. The filter components may further comprise one or more capacitors connected to the connection lines and to a neutral voltage such as ground.

The current sensors are arranged to provide a signal that at least represents a sum of the currents in the connection lines. This value is used as a measured input or process value for the controller. It is also possible that the sensor provides a signal that represents the current in each of the connection lines individually. In this case the values that these signals represent are added and provided as the measured value to the controller. The current sensor may have the bandwidth of the switching frequency.

The control circuit uses a modulation known as discontinuous pulse width modulation to drive the semiconductor switches. This type of modulation uses the reference voltage signal of FIG. 1 or a similar waveform to generate switching times for the semiconductor switches of the half-bridges. The switching times are created by using the reference voltage signal in conjunction with a triangular carrier waveform. The reference voltage signal leads to certain parts of the AC voltage period length wherein one of the switches is permanently on while the other switch of a half-bridge is permanently off. These parts are much longer than the switching period which in typical converters is 100 us or less. For example, in a pulse width modulation wherein the reference voltage signal of FIG. 1 is used and which may be called a 60° bus clamped modulation, the part wherein both switches are in permanent-on and, respectively, permanent-off mode are 60° of an AC waveform, i.e. in a 50 Hz system the length of this part of the period is ⅙ of 20 ms, i.e. 3.3 ms.

A power converter incorporating teachings of the present disclosure uses a reference voltage signal that is different from FIG. 1 in that the voltage steps of the reference voltage are smoothed or softened. This removes the voltage steps included in the waveform of FIG. 1. This also means that the part where a permanent-on and permanent-off mode occurs is shorter than 60°. It is however longer than 10°, i.e. it comprises several switching periods.

The smoothed reference voltage signal is taken by the controller as well as the measured current which is the sum of the currents on the connection lines and a result is provided by the controller. The result is factored into the reference voltage signal before it is used in conjunction with the carrier to determine the switching times.

Further features that may be added alone or together in exemplary embodiments of teachings herein include:

In some embodiments, the power converter may comprise exactly three half-bridges connected in parallel and thus be a three-phase power converter. Three-phase power is widely used in all industrial applications.

In some embodiments, the control circuit may be arranged to operate the semiconductor switches so that a contiguous part of at least 50° of the voltage period of the first voltage one of the semiconductor switches is kept in an on-state while the other of the semiconductor switches is kept in an off-state. Thus while not the full extent of a 60° bus clamped modulation is used due to the smoothing of the reference voltage signal, the difference is small and most of the possible reduction of switching losses is achieved. The control circuit may further be arranged to operate the semiconductor switches so that a contiguous part of less than 60° of the voltage period of the first voltage one of the semiconductor switches kept in an on-state while the other of the semiconductor switches is kept in an off-state. In other words, not the full extent of a 60° bus clamped modulation is used.

In some embodiments, the filter circuit may comprise a common mode filter and a differential mode filter, wherein the common mode filter comprises a coupled inductor with a coil in each connection line between the first voltage and the half-bridges.

In some embodiments, the controller may be arranged to apply a low pass filter or a band pass filter to the reference voltage signal. This filter step is arranged to filter out any disturbances due to the pulse width modulation which occur at the switching frequency of the power semiconductor switches, for example 15 kHz or 50 kHz as well as the AC voltage frequency, typically 50 Hz or 60 Hz. In the case of the band pass filter it is arranged to allow frequencies between 150 Hz and the switching frequency.

In some embodiments, the controller may be arranged to apply a division by an effective capacitance value to the reference voltage signal. The effective capacitance value may be derived by using the electrical equivalent capacitance of the common mode and differential mode filter capacitors. The controller may further be arranged to apply a time derivative to the reference voltage signal. In this way, the reference voltage signal which is used as a setpoint input is modified to be equivalent to a current flowing in the connection lines which is conducive to comparing it with the measured current signal.

In some embodiments, the controller may be arranged to apply a low pass filter or a band pass filter to the signal of the current sensor. This filter has a similar effect to the low-pass filter used on the reference voltage.

In some embodiments, the controller may be arranged to create a modified reference voltage signal by applying a negative feedback signal created from the signal of the current sensor and the reference voltage signal. In other words, the modified reference voltage signal and the modified current signal are combined and the result of the combination is itself applied to the original smoothed reference voltage signal. This negative feedback from the actual current will make the actual voltage follow the smoothed reference voltage signal more closely, especially if outside influences are present on the power converter.

In some embodiments, the controller as well as the parts that apply low pass filters and other signal modifications may be implemented as an algorithm and as part of the control circuit. In some embodiments, some parts of it may be arranged as electronic components.

Figure 2:
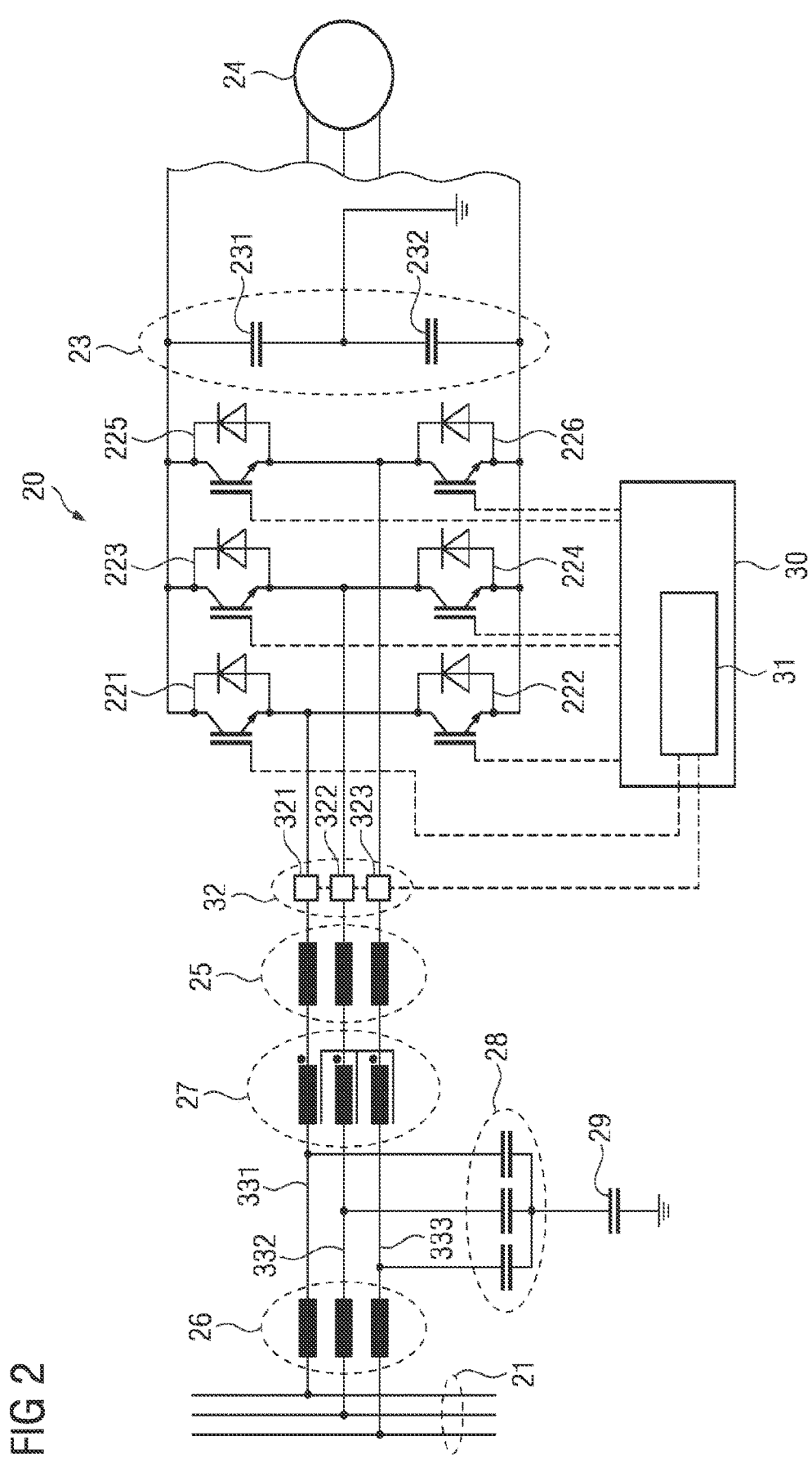
FIG. 2 illustrates a three-phase power converter with a control circuit implementing a discontinuous pulse width modulation with active compensation incorporating teachings of the present disclosure.

FIG. 2 illustrates an example three-phase power converter 20 incorporating teachings of the present disclosure. Power converter 20 is connected to a three-phase voltage supply 21 such as the supply grid. The central part of power converter 20 is a setup of six power semiconductor switches 221 . . . 226 arranged in three half-bridges of two switches 221 . . . 226 each wherein the half-bridges are connected in parallel. The outer terminals of the half-bridges are connected to a DC link 23 which in this case comprises to DC link capacitors 231, 232.

In this embodiment, the power converter 20 is further connected from the DC link 23 to an inverter circuit that is not shown in FIG. 2 and to a motor 24 comprising the load of this circuit. Between the half-bridges and the voltage supply 21 several filter components are arranged. Each of a first and a second differential mode inductor 25, 26 as well as a common inductor 27 comprise three coils each arranged in the three connection lines 331 ... 333 between the center points of the half-bridges and the supply voltage 21.

Further filter components are three differential mode filter capacitors 28 arranged in further connections from each of the connection lines 331 ... 333 towards a ground voltage and a single common mode capacitor 29 between the differential mode filter capacitors 28 and the ground voltage.

Figure 3:
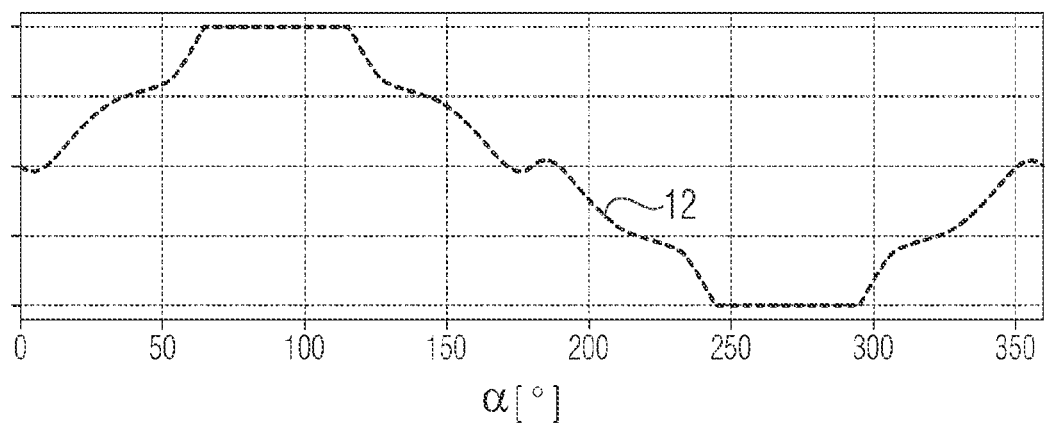
FIG. 3 shows a reference voltage signal for discontinuous pulse width modulation with softening applied incorporating teachings of the present disclosure.

The power semiconductor switches 221 ... 226 are controlled by control circuit 30. Control circuit 30 uses synchronous reference frame control. It employs a reference voltage signal 12 to control the switching times of the power semiconductor switches 221 ... 226 which is shown in FIG. 3. Reference voltage signal 12 is similar to reference voltage signal 10 but is smoothed in comparison to reference voltage signal 10. The smoothing that is applied to reference voltage signal 10 removes any steps, e.g. any instantaneous changes in the reference voltage signal 10, making it a continuous function. In addition, the smoothing is applied in such a way to also make its derivative continuous, making the reference voltage signal 12 differentiable.

Figure 4:
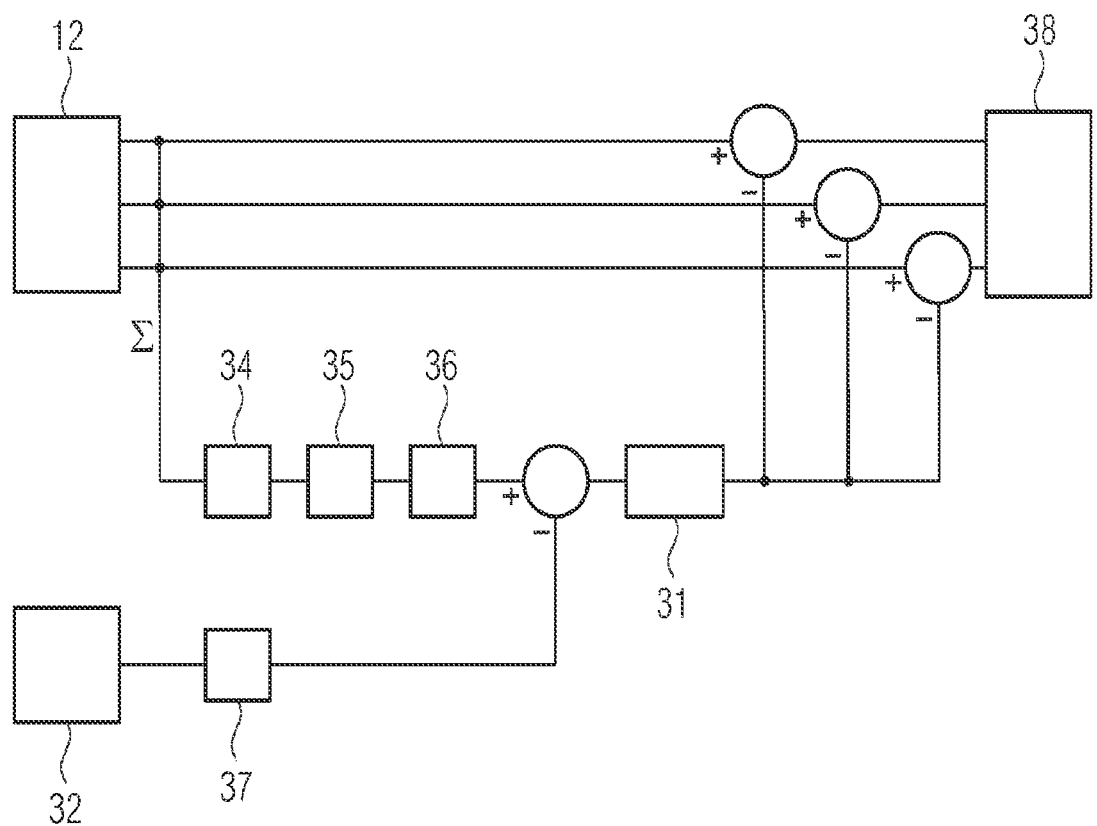
FIG. 4 illustrates a controller used in a power converter incorporating teachings of the present disclosure.

Additionally, control circuit 30 comprises a proportional feedback loop controller 31 to further influence the switching of the power semiconductor switches 221 ... 226. FIG. 4 shows the elements that comprise the feedback loop used by controller 31. The smoothed reference voltage signal 12 is used as a time variable set point. The voltage values for the three phases are added to form the single set point value. The measured value used in controller 31 is the sum of the currents 32 on the connection lines 331 ... 333. To measure the currents, current sensors 321 ... 323 are arranged in the connection lines 331 ... 333.

For the set point value, a first processing step 34 comprises applying a low pass filter. In this example the switching frequency of the switches 221 ... 226 is 150 kHz. The low pass filter is arranged to allow frequencies of less than the switching frequency, for example less than 100 kHz to pass. The cut-off frequency can also be brought closer to the switching frequency. As another example, 145 kHz could be used as a cut-off frequency. In some embodiments, a band pass filter might be used instead of the low pass filter, with the band pass filter additionally blocking frequencies below 150 Hz.

In a second step 35, the resulting value is divided by an effective common mode capacity value. This effective common mode capacity value comprises the combined effect of the series connection of the differential mode capacitors 28 and the common mode capacitor 29. In a third step, the time derivative of the resulting value is created.

For the measured value, a low pass filter is also applied in a fourth step 37. The resulting values for the measured value and the reference voltage are then combined by subtracting the result of the fourth step 37 from the result of the third step 36. This resulting value is then subtracted as a negative feedback from the individual voltage values of the three phases of the reference voltage signal 12 to form a modified reference voltage signal 38.

The modified reference voltage signal 38 is then passed on to be used as final modulation references for the generation of the gate pulses for the power semiconductor switches 221 ... 226. The gate pulses are generated in a known manner by comparison with a triangular carrier.

In some embodiments, the control circuit 30 comprises algorithms to execute the described individual steps 34 ... 37 such as applying a low pass filter. The controller 31 may be implemented as a software algorithm on a microcontroller that is part of control circuit 30.

Figure 5:
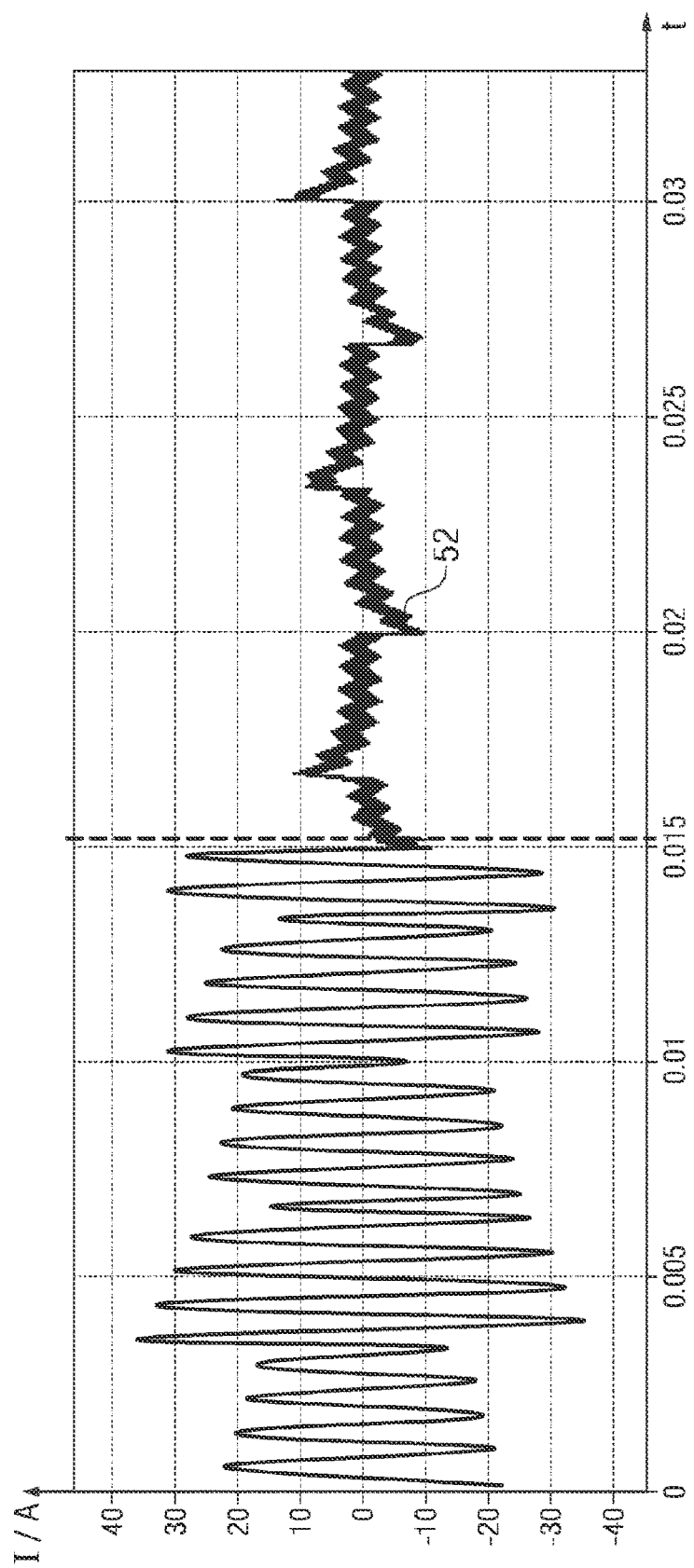
FIG. 5 shows an example for common mode current with and without active compensation incorporating teachings of the present disclosure.

FIG. 5 shows common mode current 51 using the waveform of FIG. 1 and no active compensation and common mode current 52 using the waveform of FIG. 3 and the active compensation conducted by controller 31. It can be seen that the common mode noise level can be reduced drastically. The controller 31 can be arranged to take a gain value setting as a further input. Depending on the gain value which is applied to proportional control the dampening of Any differences between the measured current and the set point obtained from the reference voltage signal are then damped more or damped less depending on the supplied gain value. In this way the intensity of the active compensation can be set from outside the controller and be adapted to the situation, such as the modulation index. A higher intensity damping results in increased switching losses but reduced common mode noise while a lower intensity damping has the opposite effect.

REFERENCE NUMBERS

10 Reference voltage signal
12 Smoothed reference voltage signal
20 Three-phase power converter
21 Voltage supply
221 ... 226 Power semiconductor switches
23 DC link
231, 232 DC link capacitors
24 Motor
25, 26 Differential mode inductors
27 Common mode inductor
28 Differential mode capacitors
29 Common mode capacitor
30 Controller
31 Proportional Controller
32 Measured current signal
321 ... 323 Current sensor
34 First step, low pass filter
35 Second step, division by effective capacitance
36 Third step, time derivative
37 Fourth step, low pass filter
38 Modified reference voltage signal
51 Common mode noise without compensation
52 Common mode noise with active compensation

What is claimed is:

1. A power converter to convert between a first, AC voltage and a second voltage, the power converter comprising:
    at least two half-bridges connected in parallel, each half-bridge comprising two semiconductor switches connected serially with the outer terminals of the half-bridge forming terminals for the second voltage;
    a filter circuit connected between respective midpoints of the half-bridges and terminals for the first voltage, the filter circuit comprising an inductor and a capacitor;
    a current sensor for each of the at least two half-bridges arranged to measure a respective current flowing in connections between the respective midpoints of the half-bridges and the filter circuit; and
    a control circuit to operate the semiconductor switches, the control circuit arranged to determine switching times of the semiconductor switches using a modified reference voltage signal resulting in a softened bus clamp modulation;
    wherein the control circuit comprises a controller to create the modified reference voltage signal using an unmodified reference voltage signal as a setpoint input and a sum of the current signals from the current sensors as measured input.

2. The power converter of claim 1, wherein the a derivative of the modified reference voltage signal is continuous, thus making the reference voltage signal differentiable.

3. The power converter of claim 1, wherein the controller delivers a common mode current error signal.

4. The power converter of claim 1, comprising three half-bridges connected in parallel.

5. The power converter of claim 1, wherein the control circuit operates the semiconductor switches so a contiguous part of at least 10°, of the voltage period of a first voltage one of the semiconductor switches is kept in an on-state while the other of the semiconductor switches is kept in an off-state.

6. The power converter of claim 5, wherein the control circuit operates the semiconductor switches so a contiguous part of less than 60° of the voltage period of the first voltage one of the semiconductor switches is kept in an on-state while the other of the semiconductor switches is kept in an off-state.

7. The power converter of claim 1, wherein:
the filter circuit comprises a common mode filter and a differential mode filter; and
the common mode filter comprises a coupled inductor with a coil in each connection line between the first voltage and the half-bridges.

8. The power converter of claim 1, wherein the control circuit applies a low pass filter to the reference voltage signal.

9. The power converter of claim 1, wherein the control circuit applies a division by an effective capacitance value to the reference voltage signal.

10. The power converter of claim 1, wherein the control circuit applies a time derivative to the reference voltage signal.

11. The power converter of claim 1, wherein the control circuit applies a low pass filter to the signal of the current sensors.

12. The power converter of claim 1, wherein the controller creates the modified reference voltage signal by applying a negative feedback signal created from the signal of the current sensors and the reference voltage signal.

13. The power converter of claim 1, wherein the controller receives a gain value as a further input value, and applies the gain value to its proportional control.

* * * * *